(12) United States Patent
Mehrotra et al.

(10) Patent No.: US 12,493,350 B1
(45) Date of Patent: Dec. 9, 2025

(54) VEHICLE SIMULATION SYSTEM AND METHOD

(71) Applicant: Honda Motor Co., Ltd., Tokyo (JP)

(72) Inventors: Shashank Kumar Mehrotra, Campbell, CA (US); Teruhisa Misu, San Jose, CA (US); Kumar Akash, San Jose, CA (US); Zhaobo Zheng, Campbell, CA (US); Blaine A. Levedahl, San Louis Obispo, CA (US); Timothy J. Buker, Morro Bay, CA (US); Kevin J. Salubre, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/739,826

(22) Filed: Jun. 11, 2024

(51) Int. Cl.
*G06F 3/01* (2006.01)
*G06V 10/82* (2022.01)
*G06V 20/59* (2022.01)
*G06V 40/10* (2022.01)

(52) U.S. Cl.
CPC .............. *G06F 3/015* (2013.01); *G06V 10/82* (2022.01); *G06V 20/59* (2022.01); *G06V 40/10* (2022.01)

(58) Field of Classification Search
CPC ........ G06F 3/015; G06V 10/82; G06V 20/59; G06V 40/10
See application file for complete search history.

(56) References Cited

U.S. PATENT DOCUMENTS

| | | | |
|---|---|---|---|
| 2008/0146336 A1* | 6/2008 | Feldman | A63F 13/24 463/37 |
| 2020/0089177 A1* | 3/2020 | Tao | G05B 17/02 |
| 2020/0103967 A1* | 4/2020 | Bar-Zeev | G06F 3/147 |
| 2023/0012960 A1* | 1/2023 | Krishnan | A61B 5/486 |
| 2023/0144771 A1* | 5/2023 | Hall | G09B 9/203 434/30 |
| 2023/0219586 A1* | 7/2023 | Giersch | G16H 20/70 701/36 |
| 2023/0334788 A1* | 10/2023 | Zohni | G06F 3/012 |
| 2024/0295879 A1* | 9/2024 | Yang | G05D 1/227 |
| 2024/0390798 A1* | 11/2024 | Benbassat | A63F 13/67 |

* cited by examiner

*Primary Examiner* — Premal R Patel

(74) *Attorney, Agent, or Firm* — Rankin, Hill & Clark LLP

(57) ABSTRACT

A vehicle simulation system includes a control mechanism that is actuated by a user to control a vehicle in a simulation, and a plurality of sensors that generate a multimodal signal. The multimodal signal indicates a state of the user during the simulation. The vehicle simulation system also includes at least one processor that receives the multimodal signal from the plurality of sensors, develops a workload model based on the multimodal signal using a machine learning algorithm, and determines a workload experienced by the user based on the multimodal signal and the workload model.

19 Claims, 6 Drawing Sheets

VEHICLE SIMULATION SYSTEM AND METHOD

BACKGROUND

In recent years, the flexibility of vertical take-off and landing (VTOL) aircraft has made these vehicles popular in development, research, and operation. When compared to traditional fixed-wing aircraft and rotorcraft, VTOLs bring unique challenges as they combine many maneuvers from both types of aircraft. Pilot workload is an important factor for safe and efficient operation of VTOLs. Consequently, there is demand for a system capable of active workload monitoring in vehicles such as VTOLs, and determining a perceived workload in a corresponding user.

BRIEF DESCRIPTION

According to one aspect, a vehicle simulation system includes a control mechanism that is actuated by a user to control a vehicle in a simulation, and a plurality of sensors that generate a multimodal signal. The multimodal signal indicates a state of the user during the simulation. The vehicle simulation system also includes at least one processor that receives the multimodal signal from the plurality of sensors, develops a workload model based on the multimodal signal using a machine learning algorithm, and determines a workload experienced by the user based on the multimodal signal and the workload model.

According to another aspect, a method of determining workload experienced in a vehicle simulation includes generating a multimodal signal using a plurality of sensors, where the multimodal signal indicates a state of a user operating a vehicle in the simulation. The method also includes developing a workload model based on the multimodal signal using a machine learning algorithm, and determining a workload experienced by the user based on the multimodal signal and the workload model using a machine learning algorithm.

According to another aspect, a non-transitory computer readable storage medium stores instructions that, when executed by a computer having a processor, causes the processor to perform a method. The method includes generating a multimodal signal using a plurality of sensors, where the multimodal signal indicates a state of a user operating a vehicle in the simulation. The method also includes developing a workload model based on the multimodal signal using a machine learning algorithm, and determining a workload experienced by the user based on the multimodal signal and the workload model using a machine learning algorithm.

DETAILED DESCRIPTION

Figure 1:
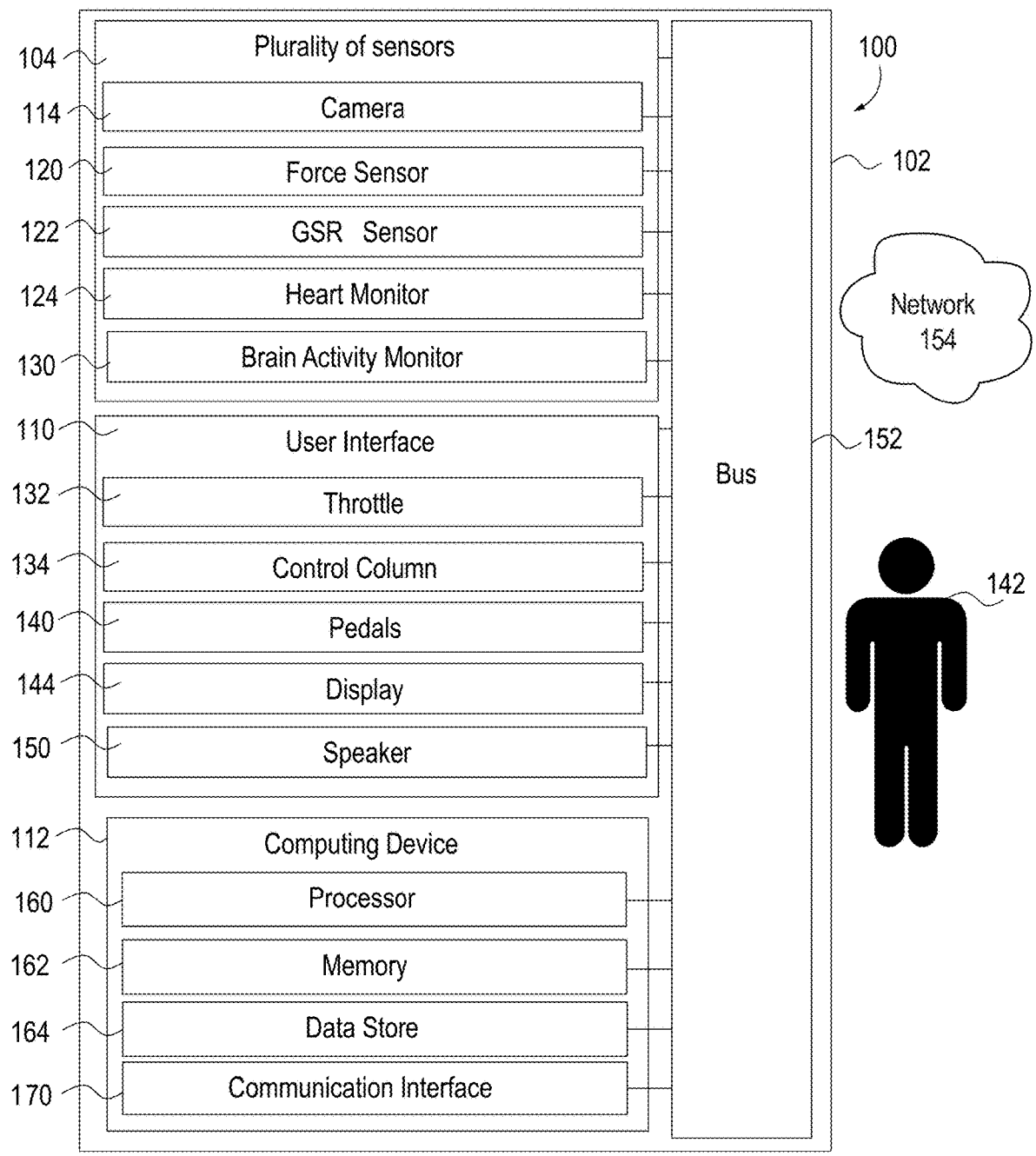
FIG. 1 is an exemplary operating environment of a simulation system for determining workload experienced by a user.

The systems and methods disclosed herein are configured to identify and estimate a workload experienced by a user in a vehicle simulation based on a multimodal signal generated by a plurality of sensors. The multimodal signal indicates a variety of physiological data and behavior information of the user collected during the simulation that may be used to develop a workload model for determining a degree of workload experienced by the user. A vehicle simulation system incorporating the plurality of sensors and the workload model is configured to simulate a VTOL aircraft and determine a degree of workload experienced by a pilot as the user, indicating at least one of stress and fatigue of the pilot during the simulation.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Mobile device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein may include, but is not limited to, a computing device component (e.g., a processor) with circuitry that may be worn or attached to user. In other words, a wearable computing device is a computer that is subsumed into the personal space of a user. Wearable computing devices may include a display and may include various sensors for sensing and determining various parameters of a user. For example, location, motion, and physiological parameters, among others. Exemplary wearable computing devices may include, but are not limited to, watches, glasses, clothing, gloves, hats, shirts, jewelry, rings, earrings necklaces, armbands, leashes, collars, shoes, earbuds, headphones and personal wellness devices.

System Overview

Referring now to the drawings, the drawings are for purposes of illustrating one or more exemplary embodiments and not for purposes of limiting the same. FIG. 1 is an exemplary component diagram of an operating environment 100 of a simulation system 102 including a plurality of sensors 104, a user interface 110, and a computing device 112. The plurality of sensors 104 includes a camera 114, a force sensor 120, a galvanic skin response (GSR) sensor 122, a heart monitor 124, and a brain activity sensor 130. The user interface 110 includes a throttle 132, a control column 134, and pedals 140 that are each actuated by a user 142 as a control mechanism used to control a vehicle during a simulation. The user interface 110 also includes a display 144 and a speaker 150 that produce an audiovisual simulation of operating a vehicle to the user 142. In this manner, the display 144 and the speaker 150 indicate a state of the simulation to the user 142.

The plurality of sensors 104, the user interface 110, the computing device 112, and components thereof may be interconnected by a bus 152. The components of the operating environment 100, as well as the components of other systems, hardware architectures, and software architectures discussed herein, may be combined, omitted, or organized into different architectures for various embodiments.

The computing device 112 may be implemented as a part of the simulation system 102 or another device, e.g., a remote server (not shown), connected via a network 154. The computing device 112 may be capable of providing wired or wireless computer communications utilizing various protocols to send and receive electronic signals internally to and from components of the operating environment 100. Additionally, the computing device 112 may be operably connected for internal computer communication via the bus 152 (e.g., a Controller Area Network (CAN) or a Local Interconnect Network (LIN) protocol bus) to facilitate data input and output between the computing device 112 and the components of the operating environment 100.

The computing device 112 includes a processor 170, a memory 172, a data store 174, and a communication interface 180, which are each operably connected for computer communication via the bus 152. The communication interface 180 provides software and hardware to facilitate data input and output between the components of the computing device 112 and other components, networks, and data sources described herein.

The simulation system 102 is configured to determine a workload experienced by the user 142 during a simulation based on a multimodal signal generated by the plurality of sensors 104 and received by the computing device 112. The multimodal signal indicates an overall state of the user 142 captured by the plurality of sensors 104 during the simulation. In this regard, the camera 114, the force sensor 120, the GSR sensor 122, the heart monitor 124, and the brain activity sensor 130 input different modalities to the computing device 112 as parts of the multimodal signal.

Figure 2:
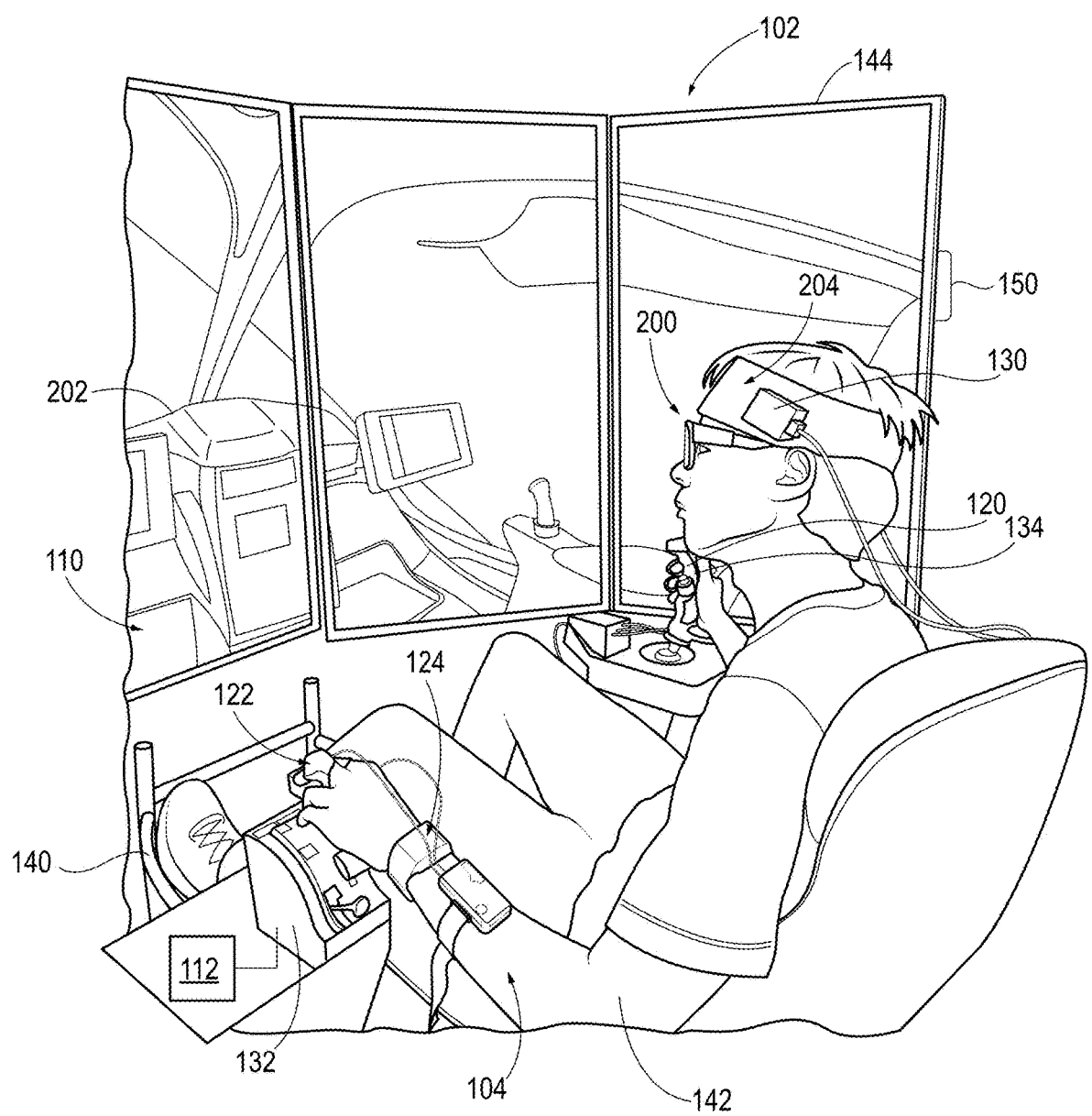
FIG. 2 is a perspective view of the user in the simulation system.

As shown in FIG. 2, the camera 114 generates image data of the user 142 during the simulation while the user 142 engages the user interface 110. The image data generated by the camera 114 indicates an eye gaze, a body pose, and semantics in the simulation system 102, including operation of control mechanisms in the user interface 110 and elements depicted on the display 144. During the simulation, the computing device 112 is configured to cause an event in the simulation that elicits response by the user 142, and determine a response time by the user 142 to the event based on the image data generated by the camera 114. The camera 114 transmits the image data to the computing device 112 as part of the multimodal signal.

While, as depicted, the camera 114 is a single camera supported on a pair of glasses 200 worn by the user 142, the simulation system 102 may additionally or alternatively include a plurality of cameras that have similar features and function in a similar manner as the camera 114 for generating image data of the user 142 during the simulation, including cameras supported on various elements of the simulation system 102 such as the user interface 110. Also, the simulation system 102 may additionally or alternatively include optical, infrared, or other cameras, light detection and ranging (LiDAR) systems, position sensors, proximity sensors, ultrasonic sensors, and a variety of other non-contact sensors and sensor combinations as the camera 114 for monitoring user behavior without departing from the scope of the present disclosure.

With continued reference to FIG. 2, the force sensor 120 is supported on the control column 134, where the user 142 grips the control column 134 to operate a vehicle 202 depicted on the display 144. The force sensor 120 generates force data during the simulation as part of the multimodal signal. The force data indicates a grip force exerted by the user 142 on the control column 134 during the simulation. The force sensor 120 transmits the force data to the computing device 112 as part of the multimodal signal.

In the depicted embodiment, the force sensor 120 is formed from force-sensitive resistor strips provided on the control column 134, where the force data generated by the force sensor 120 is a detected electrical resistance of the force-sensitive resistor strips. While, as depicted, the force sensor 120 is formed from the force-sensitive resistor strips, the force sensor 120 may additionally or alternatively include strain gages, load cells, and a variety of other contact sensors and sensor combinations supported in the control column 134. Also, the simulation system 102 may additionally or alternatively include the force sensor 120 supported on the throttle 132 and the pedals 140 without departing from the scope of the present disclosure.

The GSR sensor 122 is worn by the user 142 and generates skin conductance data as part of the multimodal signal. The skin conductance data generated by the GSR sensor 122 indicates a conductance of skin of the user 142 at the GSR sensor 122 during the simulation. The GSR sensor 122 includes at least two electrodes that direct an electric current along the skin of the user 142 to generate the skin conductance data. While, as depicted, the GSR sensor 122 is worn on fingers of the user 142, the GSR sensor 122 may additionally or alternatively be worn on other portions of the skin of the user 142 to generate the skin conductance data without departing from the scope of the present disclosure.

The heart monitor 124 is worn by the user 142 and generates heart rate data as part of the multimodal signal. The heart rate data generated by the heart monitor 124 indicates a heart rate of the user 142 during the simulation. While, as depicted, the heart monitor 124 is worn on a wrist of the user 142, the heart monitor 124 may additionally or alternatively be worn on other portions of the user 142 for generating the heart rate data, such as the fingers, an arm, a leg, and a chest.

The brain activity sensor 130 is worn by the user 142 and generates brain activity data as part of the multimodal signal. The brain activity data generated by the brain activity sensor 130 indicates brain activity by the user 142 during the simulation. The brain activity sensor 130 is a functional near-infrared spectroscopy (fNIRS) sensor supported on a headband 204 worn by the user 142. The brain activity sensor 130 may additionally include an electroencephalography (EEG) sensor, or another known sensor worn by the user 142 for measuring brain activity.

Figure 3:
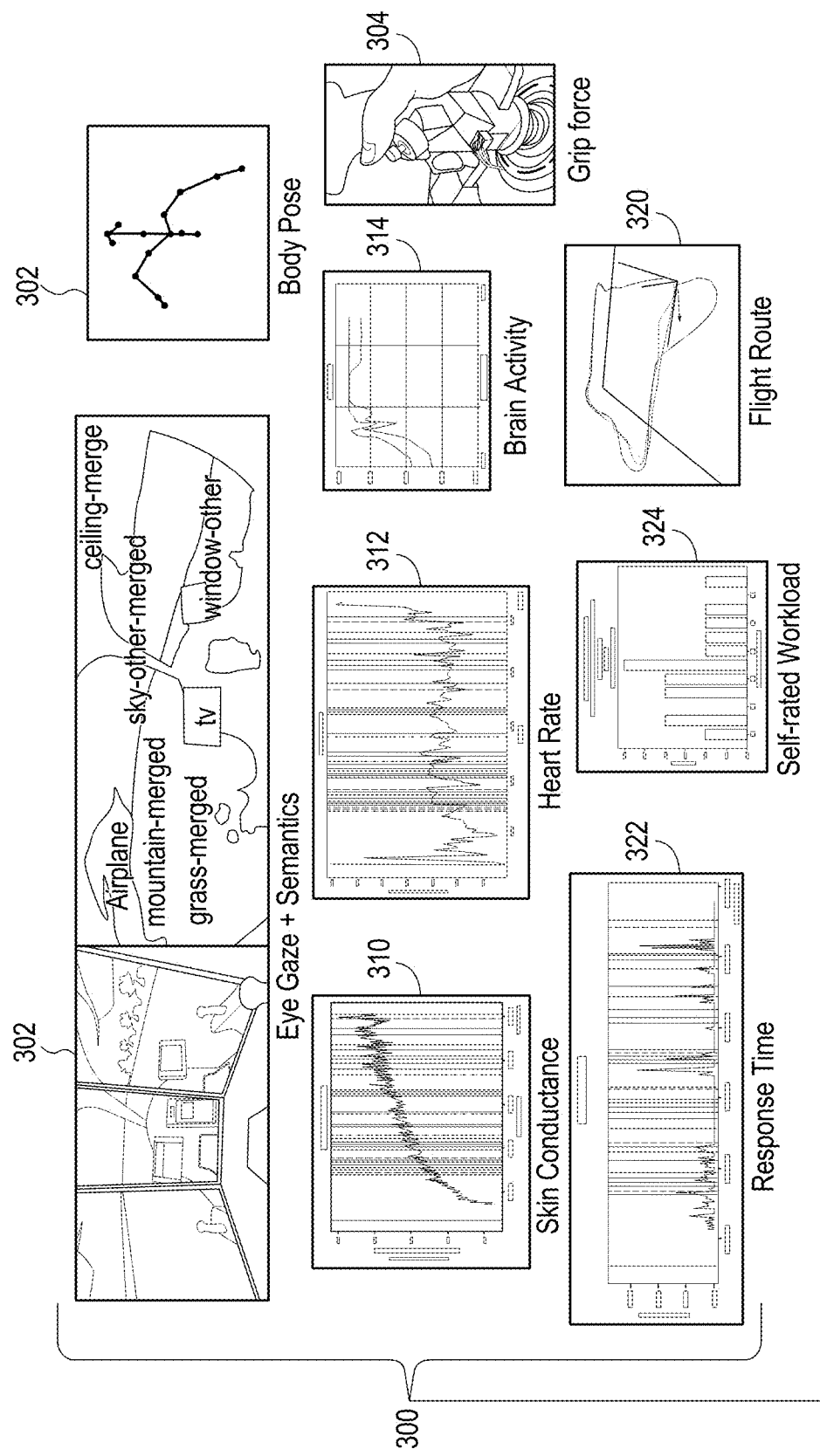
FIG. 3 is a diagram of a multimodal signal generated by a plurality of sensors included in the simulation system.

FIG. 3 depicts sources of information included in the multimodal signal 300 processed by the computing device 112. As depicted, the multimodal signal 300 includes the image data 302 generated by the camera 114 indicating the eye gaze of the user 142 and the semantics of the simulation system 102, including the control mechanisms of the user interface 110 and objects depicted on the display 144. The multimodal signal also includes the image data 302 generated by the camera 114 indicating the body pose of the user 142. The multimodal signal also includes the force data 304 generated by the force sensor 120, the skin conductance data 310 generated by the GSR sensor 122, the heart rate data 312 generated by the heart monitor 124, and the brain activity data 314 generated by the brain activity sensor 130.

The multimodal signal further includes travel data 320 indicating a travel route performed by the vehicle 202 during the simulation under operation by the user 142, and the computing device 112 is configured to determine a change in workload experienced by the user 142 along the travel route. In this regard, the computing device 112 determines the workload experienced by the user 142 along portions of the travel route, and determines a change in the determined workload between different portions of the travel route based on the travel data 320.

More specifically, the computing device 112 receives predetermined operation information indicating a plurality of different operations to be performed by the user 142 in the vehicle 202 during the simulation, along the travel route. The computing device 112 determines the travel route performed by the vehicle 202 during the simulation as the travel data 320. The computing device 112 determines a conformity between performance by the user 142 and the predetermined operation information for each operation along the travel route, and processes the determined conformity as part of the multimodal signal. In this manner, the computing device 112 determines different workloads experienced by the user 142 for the plurality of different operations along the travel route based on the determined conformity.

The plurality of different operations performed along the travel route may include a same operation, or a same series of operations performed repeatedly. With this construction, the simulation system 102 is configured to determine a workload experienced by the user 142 due to repeated flight routines performed under a predetermined schedule. The computing device 112 may determine the workload for a plurality of consecutive operations in the plurality of operations. As such, the simulation system 102 is configured to determine an affect on workload experienced by the user 142 over time and across different operations of a single travel route.

The response time of the user 142 in the simulation, determined based on the image data 302 as described above, is recorded as response data 322 corresponding to the different operations performed by the user 142 along the travel route. The response data 322 is processed by the computing device 112 as part of the multimodal signal 300.

The vehicle 202 is a vertical take-off and landing (VTOL) aircraft digitally simulated by the computing device 112. Examples of different operations performed by the user 142 as a pilot of the vehicle include taxiing from a tower to a runway, executing vertical takeoff, transitioning to a forward flight, flying level at a predetermined altitude and heading, turning in flight, ascending, descending, entering a traffic pattern, leaving a traffic pattern, and landing. While, as depicted, the vehicle 202 is a digital VTOL aircraft, the vehicle 202 may alternatively be a variety of vehicles including a plane, glider, boat, car, or other user operated vehicle. In this regard, the different operations performed by the user 142 operating the vehicle 202 may additionally or alternatively include a variety of operations associated with the form and function of the vehicle 202 simulated by the simulation system. Also, the vehicle 202 may be a physical vehicle provided with the plurality of sensors 104 and the control mechanisms of the user interface 110 for determining a workload of the user 142 without departing from the scope of the present disclosure.

The travel route performed by the vehicle 202 may be compared to a predetermined travel route to determine conformity in performance by the user 142 to the predetermined travel route. With this construction, the travel route performed by the vehicle 202, and the predetermined travel route are each included in the travel data 320 as part of the multimodal signal processed by the computing device 112 to determine the workload of the user 142.

The computing device 112 receives self-rated workload data 322 from the user 142 as part of the multimodal signal. The self-rated workload data 322 indicates a workload experienced by the user 142 during the simulation. In an embodiment, the user 142 retrospectively reports the workload experienced during the simulation, including different portions of the simulation, and the computing device 112 receives the self-rated workload data 322 reported by the user 142 after the simulation is completed. With this construction, the user 142 is relatively focused on operating the vehicle 202 during the simulation, such that providing the self-rated workload data does not affect operation of the vehicle 202, or add to the workload experienced by the user 142.

Figure 4:
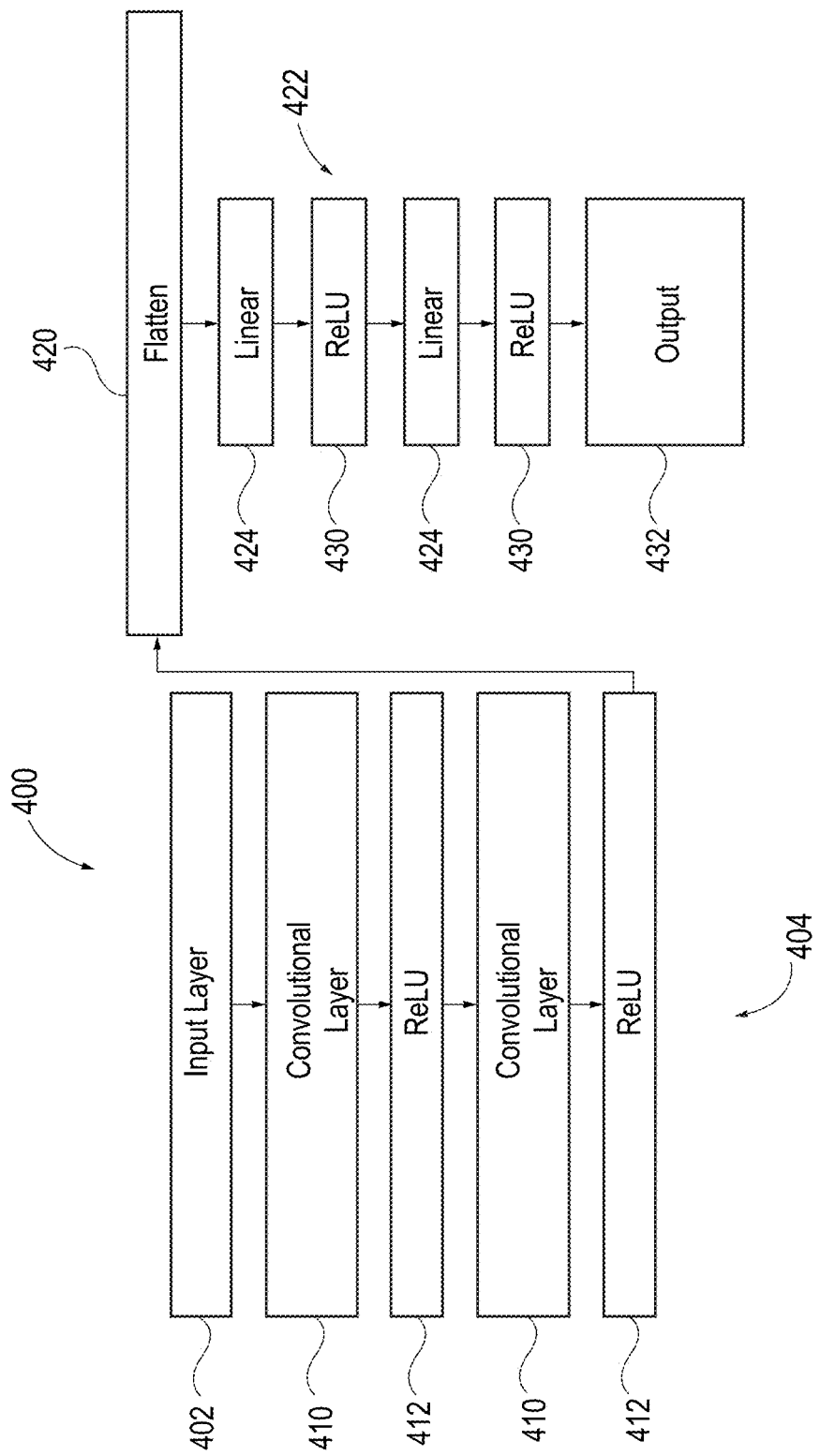
FIG. 4 is a diagram of a machine learning algorithm that processes the multimodal signal.

FIG. 4 depicts a machine learning algorithm 400 executed by the computing device 112 for processing the multimodal signal 300. The machine learning algorithm 400 includes a convolutional neural network (CNN) having an input layer 402 that receives the multimodal signal 300. The input layer 402 receives each of the image data 302, the force data 304, the skin conductance data 310, the heart rate data 312, the brain activity data 314, the travel data 320, and the self-rated workload data 322 as parts of the multimodal signal 300.

The CNN includes a set 404 of alternating convolutional layers 410 and rectified linear units 412 that receives information from the input layer 402. In this regard, the input layer 402 processes and transmits the multimodal signal 300 to a first convolutional layer 414 in the set, where the multimodal signal 300 is subsequently processed by subsequent alternating rectified linear units 412 and convolutional layers 410. The set 404 of alternating convolutional layers 410 and rectified linear units 412 reduce spatial dimensions of the multimodal signal 300 from the input layer 402 by extracting features from different spatial locations of the multimodal signal 300, and form a hierarchical representation of data in the multimodal signal 300 for determining the workload of the user 142. While, as depicted, the set 404 includes two convolutional layers 410 and two rectified linear units 412, the set 404 may include more or fewer convolutional layers 410 and rectified linear units 412 arranged in an alternating order without departing from the scope of the present disclosure.

The CNN includes a flatten layer 420 that receives information from the set of alternating convolutional layers 410 and rectified linear units 412. In this regard, the set of alternating convolutional layers 410 and rectified linear units 412 process and transmit the multimodal signal 300 from the input layer 402 to the flatten layer 420.

The CNN includes a set 422 of alternating linear layers 424 and rectified linear units 430 that receive information from the flatten layer 420. In this regard, the flatten layer 414 processes the multimodal signal 300 from the set 404 of alternating convolutional layers 410 and rectified linear units 412 into a linear vector, and transmits the linear vector to the set 422 of alternating linear layers 424 and rectified linear units 430. The set 422 of alternating linear layers 424 and rectified linear units 430 are fully connected and configured to process the linear vector received from the flatten layer 414. More specifically, the set 422 of alternating linear layers 424 and rectified linear units 430 are configured to determine a class of workload experienced by the user 142 during the simulation based on the information received from the flatten layer 414. While, as depicted, the set 422 includes two linear layers 424 and two rectified linear units 430, the set 422 may include more or fewer linear layers 424 and rectified linear units 430 arranged in an alternating order without departing from the scope of the present disclosure.

In an embodiment, the set 422 of alternating linear layers 424 and rectified linear units 430 determine the class of the workload at an output layer 432 as one of a high workload, a medium workload, and a low workload. The medium workload class is defined by a range of standard deviations from a mean value of workload experienced by the user 142 across the plurality of different operations. The low workload class is defined below the range of standard deviations defining the medium workload class. The high workload class is defined above the range of standard deviations defining the medium workload class.

As described, the computing device 112 develops the CNN as a workload model based on the multimodal signal 300 using the machine learning algorithm 400. In an embodiment, developing the CNN as a workload model includes dividing extracted features from the multimodal signal 300 into training and validation sets using cross-validation for each operation performed by the user 142 in the simulation system 102. The extracted features of the multimodal signal 300 include the image data 302, the force data 304, the skin conductance data 310, the heart rate data 312, the brain activity data 314, the travel data 320, and the self-rated workload data 322.

As such, the CNN is developed based on behavior by the user 142 in the simulation system 102. The CNN may be first developed based on behavior by a plurality of users in a manner similar to the user 142, and then further developed based on behavior by the user 142 in the simulation system 102. In an embodiment, the CNN is developed to be generic to individual users by dividing extracted features from multimodal signals corresponding to the plurality of users from a plurality of simulations into training and validation sets.

With this construction, the computing device 112 may receive the CNN as a workload model that is generic to individual users, including the user 142, and then further develop the CNN according to behavior by the user 142 during the simulation indicated by the multimodal signal 300. As such, the CNN may be developed towards individual users, increasing an accuracy of the CNN in determining the workload experienced by the user 142.

With the CNN developed as a workload model of the user 142, the computing device 112 is configured to determine the workload experienced by the user 142 based on the multimodal signal 300 and the CNN. The computing device 112 determines the workload to indicate effects of fatigue and stress experienced by the user 142 during the simulation.

In an embodiment, the computing device 112 determines the workload experienced by the user 142 and causes the user interface 110 to indicate the workload during the simulation. In this regard, the computing device 112 may generate a warning to the user 142 via the display 144 and the speaker 150 when the determined workload has exceeded a threshold value. The computing device 112 may additionally or alternatively transmit determined workload data to a remote server for remotely monitoring the workload experienced by the user 142.

Methods for Determining User Workload in a Simulation System

Figure 5:
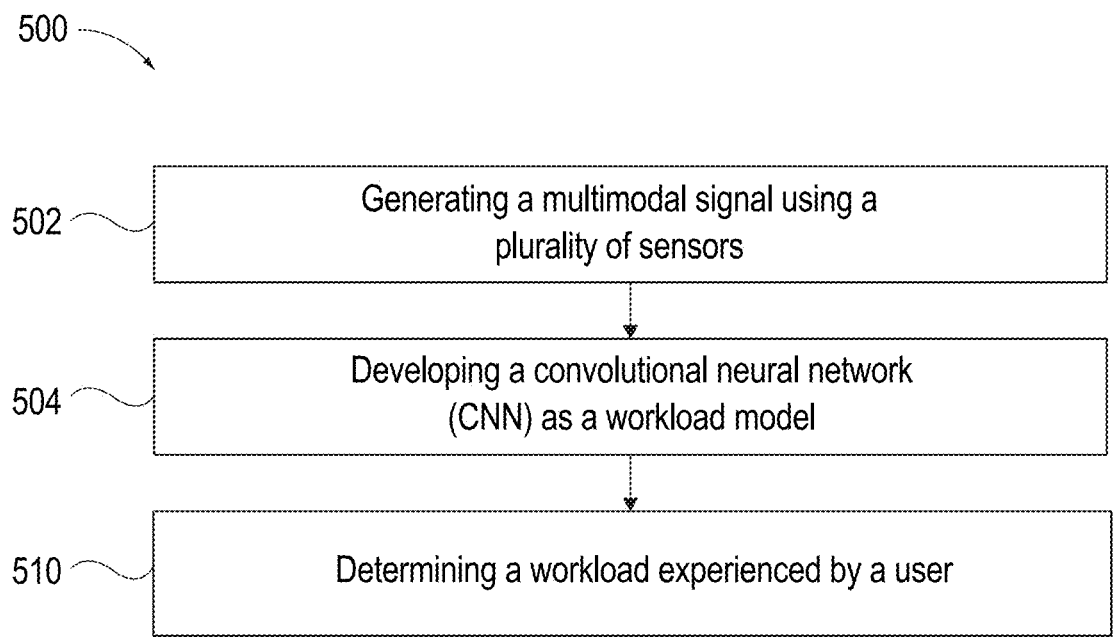
FIG. 5 is an exemplary process flow for determining workload experienced by the user in the simulation system.

Referring to FIG. 5, a computer-implemented method for determining the workload experienced by the user 142 with the simulation system 102 will be described according to an exemplary embodiment. FIG. 5 will be described with reference to FIGS. 1-4. For simplicity, the method 500 will be described as a sequence of blocks, but the elements of the method 500 may be organized into different architectures, elements, stages, and/or processes.

At block 502, the method includes generating the multimodal signal 300 using the plurality of sensors 104, where the multimodal signal 300 indicates a state of a user 142 operating the vehicle 202 in the simulation. Generating the multimodal signal 300 using the plurality of sensors 104 includes generating at least one of the image data 302, the force data 304, the skin conductance data 310, the heart rate data 312, and the brain activity data 314. In this regard the method 500 includes generating the image data 302 of the user 142 during the simulation as part of the multimodal signal 300, the image data 302 indicating at least one of an eye gaze, a body pose, and a reaction time of the user 142. The method 500 also includes generating the force data 304 of the user 142 during the simulation as part of the multimodal signal 300, the force data 304 indicating the grip force exerted by the user 142 on the control mechanisms operated by the user 142 during the simulation, such as the control column 134. The method 500 also includes generating the skin conductance data 310 as part of the multimodal signal 300, the skin conductance data 310 indicating a conductance of the skin of the user 142 during the simulation. The method 500 also includes generating the heart rate data 312 as part of the multimodal signal 300, the heart rate data 312 indicating a heart rate of the user 142 during the simulation. The method 500 also includes generating the brain activity data 314 as part of the multimodal signal 300, the brain activity data indicating brain activity by the user 142 during the simulation.

At block 504, the method 500 includes developing the CNN as a workload model based on the multimodal signal 300, using the machine learning algorithm 400. In an embodiment, the computing device 112 receives the workload model as generic to a plurality of users including the user 142, and develops the workload model according to behavior by the user 142 during the simulation indicated by the multimodal signal 300.

At block 510, the method 500 includes determining a workload experienced by the user 142 based on the multimodal signal 300 and the workload model using the machine learning algorithm. In an embodiment, determining the workload at block 510 includes determining a travel route made by the vehicle 202 during the simulation, and determining the workload experienced by the user 142 along the travel route over the plurality of different operations.

Figure 6:
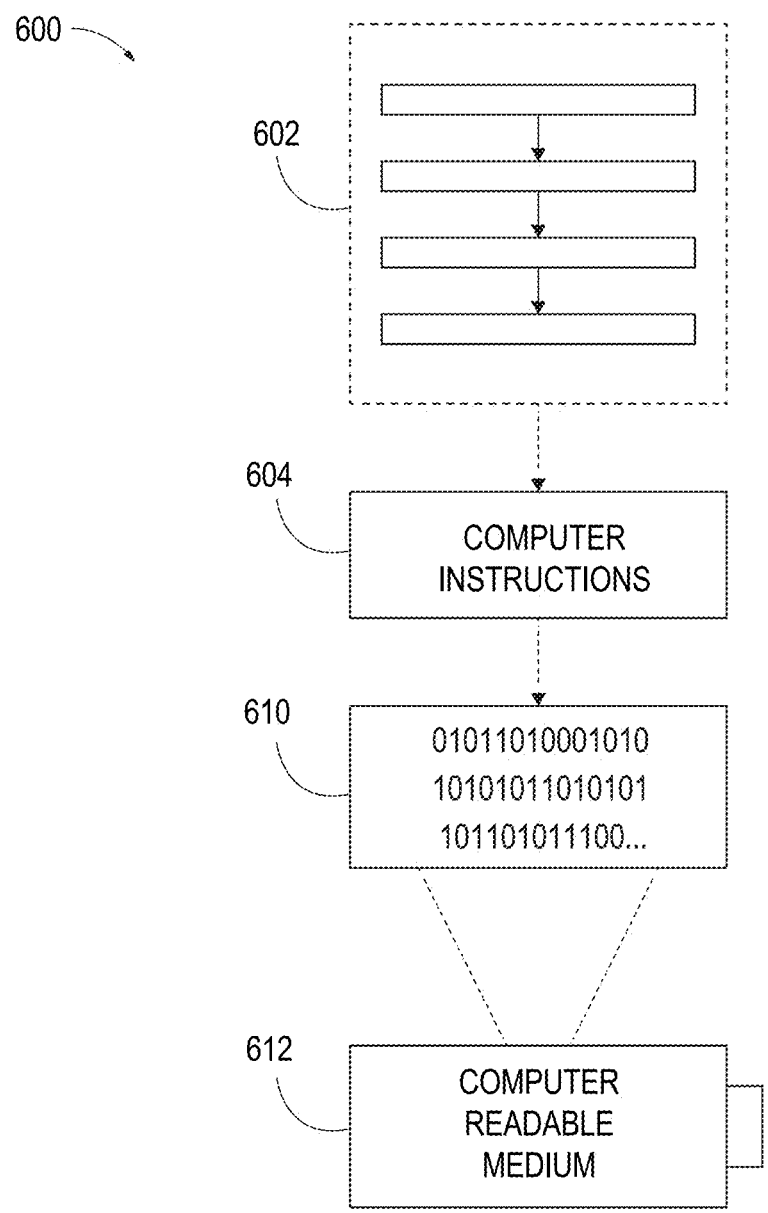
FIG. 6 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 6, where an implementation 600 includes a computer-readable medium 602, such as a CD-R, DVD-R, flash drive, a platter of a hard disk drive, etc., on which is encoded computer-readable data 604. This encoded computer-readable data 604, such as binary data including a plurality of zero's and one's as shown in 604, in turn includes a set of processor-executable computer instructions 610 configured to operate according to one or more of the principles set forth herein. In this implementation 600, the processor-executable computer instructions 610 may be configured to perform a method 612, such as the method 500 of FIG. 5. In another aspect, the processor-executable computer instructions 610 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to. It will be appreciated that various of the above-disclosed and other features and functions, or alternatives or varieties thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A vehicle simulation system comprising:
    a control mechanism that is actuated by a user to control a vehicle in a simulation;
    a plurality of sensors that generate a multimodal signal, wherein the multimodal signal indicates a state of the user during the simulation;
    at least one processor that:
        receives the multimodal signal from the plurality of sensors;
        develops a workload model based on the multimodal signal using a machine learning algorithm; and
        determines a workload experienced by the user based on the multimodal signal and the workload model,
    wherein the at least one processor receives self-rated workload data reported by the user after the simulation, and develops the workload model based on the self-rated workload data, wherein the self-rated workload data indicates a workload experienced by the user during the simulation.

2. The vehicle simulation system of claim 1, wherein the plurality of sensors includes a camera that generates image data of the user during the simulation, wherein the image data indicates at least one of an eye gaze and a body pose of the user as part of the multimodal signal.

3. The vehicle simulation system of claim 1, wherein the control mechanism is a control column, and the plurality of sensors includes a force sensor supported on the control column, wherein the force sensor generates force data during the simulation as part of the multimodal signal, the force data indicates a grip force by the user on the control column.

4. The vehicle simulation system of claim 1, wherein the plurality of sensors includes at least one of:
- a galvanic skin response (GSR) sensor worn by the user, wherein the GSR sensor generates skin conductance data as part of the multimodal signal, and the skin conductance data indicates a conductance of skin of the user during the simulation;
- a heart monitor worn by the user, wherein the heart monitor generates heart rate data as part of the multimodal signal, and the heart rate data indicates a heart rate of the user during the simulation;
- a brain activity sensor worn by the user, wherein the brain activity sensor generates brain activity data as part of the multimodal signal, and the brain activity data indicates brain activity by the user during the simulation.

5. The vehicle simulation system of claim 1, wherein the plurality of sensors includes a camera that generates image data of the user during the simulation, and
the at least one processor is configured to cause an event in the simulation, and determine a response time by the user to the event based on the image data.

6. The vehicle simulation system of claim 1, wherein the at least one processor determines a travel route by the vehicle during the simulation, and determines a change in the workload experienced by the user along the travel route.

7. The vehicle simulation system of claim 1, wherein the at least one processor receives the workload model as generic to a plurality of users including the user, and develops the workload model according to behavior by the user during the simulation indicated by the multimodal signal.

8. The vehicle simulation system of claim 1, wherein the machine learning algorithm includes a convolutional neural network (CNN) having an input layer that receives the multimodal signal, a set of alternating convolutional layers and rectified linear units that receives information from the input layer, a flatten layer that receives information from the set of alternating convolutional layers and rectified linear units, and a set of alternating linear layers and rectified linear units that receive information from the flatten layer, and determine a class of workload experienced by the user during the simulation based on the information received from the flatten layer.

9. The simulation system of claim 1, wherein the at least one processor receives predetermined operation information indicating a plurality of different operations to be performed by the user during the simulation, and determines different workloads experienced by the user for the plurality of different operations.

10. The vehicle simulation system of claim 1, wherein the vehicle is a vertical take-off and landing aircraft digitally simulated by the at least one processor.

11. The vehicle simulation system of claim 1, wherein the at least one processor determines the workload to indicate at least one of fatigue and stress experienced by the user during the simulation.

12. The vehicle simulation system of claim 1, wherein the at least one processor determines the workload for a plurality of consecutive operations performed by the user during the simulation.

13. The vehicle simulation system of claim 1, further comprising a display that indicates a state of the simulation to the user, wherein the at least one processor causes the display to indicate the workload experienced by the user during the simulation.

14. A method of determining workload experienced in a vehicle simulation, the method comprising:
generating a multimodal signal using a plurality of sensors, wherein the multimodal signal indicates a state of a user operating a vehicle in the simulation;
developing a workload model based on the multimodal signal using a machine learning algorithm; and
determining a workload experienced by the user based on the multimodal signal and the workload model using a machine learning algorithm,
further including receiving self-rated workload data reported by the user after the simulation, and developing the workload model based on the self-rated workload data, wherein the self-rated workload data indicates a workload experienced by the user during the simulation.

15. The method of claim 14, wherein generating the multimodal signal using the plurality of sensors includes at least one of:
generating image data of the user during the simulation as part of the multimodal signal, wherein the image data indicates at least one of an eye gaze, a body pose, and a reaction time of the user; and
generating force data of the user during the simulation as part of the multimodal signal, wherein the force data indicates a grip force exerted by the user on a control mechanism operated by the user during the simulation.

16. The method of claim 14, wherein generating the multimodal signal using the plurality of sensors includes at least one of:
generating skin conductance data as part of the multimodal signal as part of the multimodal signal, the skin conductance data indicating a conductance of skin of the user during the simulation;
generating heart rate data as part of the multimodal signal, the heart rate data indicating a heart rate of the user during the simulation; and
generating brain activity data as part of the multimodal signal, the brain activity data indicating brain activity by the user during the simulation.

17. The method of claim 14, further comprising determining a travel route made by the vehicle during the simulation; and
determining the workload experienced by the user along the travel route over a plurality of different operations.

18. The method of claim 14, further comprising receiving the workload model as generic to a plurality of users including the user, and developing the workload model according to behavior by the user during the simulation indicated by the multimodal signal.

19. A non-transitory computer readable storage medium storing instructions that, when executed by a computer having a processor, causes the processor to perform a method, the method comprising:
generating a multimodal signal using a plurality of sensors, wherein the multimodal signal indicates a state of a user operating a vehicle in a simulation;

developing a workload model based on the multimodal signal using a machine learning algorithm; and determining a workload experienced by the user based on the multimodal signal and the workload model using a machine learning algorithm, further including receiving self-rated workload data reported by the user after the simulation, and developing the workload model based on the self-rated workload data, wherein the self-rated workload data indicates a workload experienced by the user during the simulation.

* * * * *